(12) United States Patent
Hiromori

(10) Patent No.: US 12,466,342 B2
(45) Date of Patent: Nov. 11, 2025

(54) HOLDER AND WIRE HARNESS

(71) Applicant: SUMITOMO WIRING SYSTEMS, LTD., Yokkaichi (JP)

(72) Inventor: Yuya Hiromori, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 204 days.

(21) Appl. No.: 18/284,600

(22) PCT Filed: Mar. 29, 2022

(86) PCT No.: PCT/JP2022/015336
§ 371 (c)(1),
(2) Date: Sep. 28, 2023

(87) PCT Pub. No.: WO2022/220096
PCT Pub. Date: Oct. 20, 2022

(65) Prior Publication Data
US 2024/0174188 A1     May 30, 2024

(30) Foreign Application Priority Data

Apr. 16, 2021  (JP) ................................ 2021-069692

(51) Int. Cl.
*B60R 16/02*     (2006.01)
*H02G 3/04*      (2006.01)

(52) U.S. Cl.
CPC ....... *B60R 16/0215* (2013.01); *H02G 3/0481* (2013.01)

(58) Field of Classification Search
CPC .. B60R 16/0207; B60R 16/0215; H02G 3/04; H01B 7/0045
See application file for complete search history.

(56) References Cited

U.S. PATENT DOCUMENTS 5,305,797 A * 4/1994 Roy, Sr. ................. F16L 3/26
                                                    138/116
2013/0269981 A1* 10/2013 Shiga ..................... H02G 3/06
                                                    174/136

(Continued)

FOREIGN PATENT DOCUMENTS

JP    2012-228901 A    11/2012
JP    2013-128352 A     6/2013
(Continued)

OTHER PUBLICATIONS

Jun. 21, 2022 International Search Report issued in International Patent Application No. PCT/JP2022/015336.

*Primary Examiner* — Paresh Paghadal
(74) *Attorney, Agent, or Firm* — Oliff PLC

(57) ABSTRACT

A holder including: an inner fitting that is configured to be fitted into a longitudinal end of a cylinder that covers an outer circumference of a wire; a holding piece that protrudes from the inner fitting outward of the longitudinal end of the cylinder, and is configured to hold the wire; and a fixing portion that protrudes radially outward from the inner fitting, wherein the fixing portion includes: an outward extension that protrudes radially outward from the inner fitting and is configured to pass through a through portion provided in the cylinder; and a bent extension that bends and extends from a leading end of the outward extension.

6 Claims, 5 Drawing Sheets

(56) References Cited

U.S. PATENT DOCUMENTS

2015/0041175 A1\* 2/2015 Nakai .................. H02G 3/0418
          174/83
2017/0076841 A1  3/2017 Nakai et al.

FOREIGN PATENT DOCUMENTS

JP     2018-042317 A    3/2018
JP     2018-046910 A    3/2018

\* cited by examiner

HOLDER AND WIRE HARNESS

BACKGROUND

The present disclosure relates to a holder and a wire harness.

Conventionally, some wire harnesses include a wire member, a cylindrical member covering an outer circumference of the wire member, and a holder fixed to an end portion in the longitudinal direction of the cylindrical member (e.g., see JP 2015-35915A). The holder includes an inner fitting portion that is internally fitted in the end portion in the longitudinal direction of the cylindrical member, a holding piece that protrudes outward of the end portion in the longitudinal direction of the cylindrical member from the inner fitting portion, and holds the wire member, and a fixing protrusion that protrudes radially outward from the inner fitting portion. The fixing protrusion is fitted and housed in a through portion provided in the cylindrical member to restrict movement of the holder with respect to the cylindrical member. With such a wire harness, a position of the wire member with respect to the end portion of the cylindrical member is held.

SUMMARY

However, in the wire harness as described above, due to a force generated when the wire member is wound around the holding piece applied to the holder, the weight of the wire member applied to the holder, and the like, the fixing protrusion may come out of the through portion, and the holder may separate from the cylindrical member.

An exemplary aspect of the disclosure provides a holder and a wire harness capable of suppressing separation from a cylindrical member.

A holder according to the present disclosure includes an inner fitting that is configured to be fitted into a longitudinal end of a cylinder that covers an outer circumference of a wire; a holding piece that protrudes from the inner fitting outward of the longitudinal end of the cylinder, and is configured to hold the wire; and a fixing portion that protrudes radially outward from the inner fitting, wherein the fixing portion includes: an outward extension that protrudes radially outward from the inner fitting and is configured to pass through a through portion provided in the cylinder; and a bent extension that bends and extends from a leading end of the outward extension.

According to this configuration, the fixing portion protruding radially outward from the inner fitting includes the outward extension that protrudes radially outward from the inner fitting and passes through the through portion provided in the cylinder, and the bent extension that bends and extends from the leading end of the outward extension. Thus, the fixing portion is less likely to come out of the through portion. As such, the holder is less likely to separate from the cylinder.

A wire harness according to the present disclosure includes the holder, the wire, and the cylinder.

According to this configuration, the holder of the wire harness is less likely to separate from the cylinder.

According to the holder and the wire harness according to the present disclosure, separation of a holder from a cylindrical member can be suppressed.

DETAILED DESCRIPTION OF EMBODIMENTS

Figure 1:
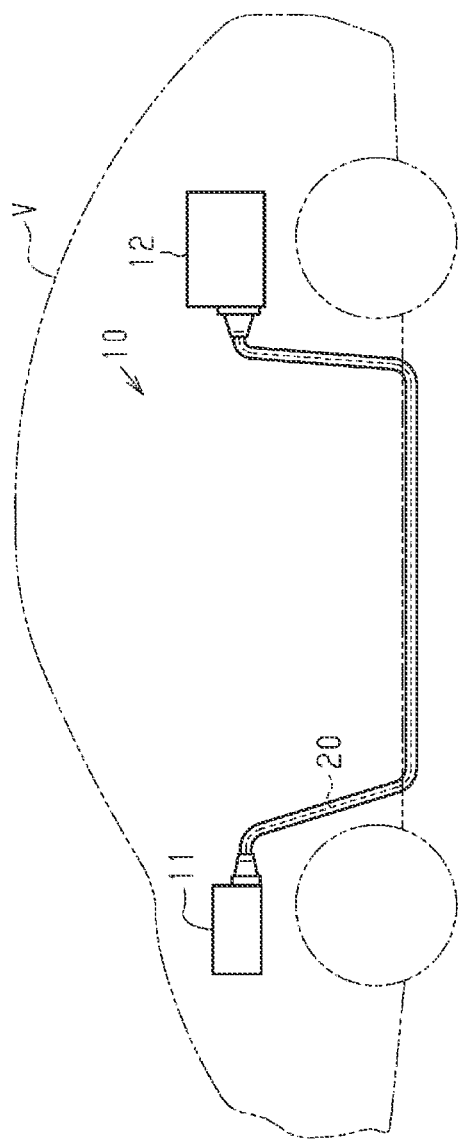
FIG. 1 is a schematic configuration diagram showing a wire harness according to an embodiment.

Description of the Embodiments of the Present Disclosure

First, embodiments of the present disclosure will be listed and described.

[1] A holder according to the present disclosure includes an inner fitting portion that is configured to be fitted into a longitudinal end portion of a cylindrical member that covers an outer circumference of a wire member, a holding piece that protrudes from the inner fitting portion outward of the longitudinal end portion of the cylindrical member, and is configured to hold the wire member, and a fixing portion that protrudes radially outward from the inner fitting portion, and the fixing portion includes an outward extending portion that protrudes radially outward from the inner fitting portion and is configured to pass through a through portion provided in the cylindrical member, and a bent extending portion that bends and extends from a leading end of the outward extending portion.

According to this configuration, the fixing portion protruding radially outward from the inner fitting portion includes the outward extending portion protruding radially outward from the inner fitting portion and passing through the through portion of the cylindrical member, and the bent extending portion bends and extends from the leading end of the outward extending portion, and thus the fixing portion is less likely to come out of the through portion. Thus, the holder is less likely to separate from the cylindrical member.

[2] The fixing portion may include a claw portion that protrudes from a leading end of the bent extending portion and is configured to be fitted into a recessed portion provided in an outer circumferential face of the cylindrical member.

According to the configuration, the fixing portion includes the claw portion that protrudes from the leading end of the bent extending portion and is fitted into the recessed portion provided in the outer circumferential surface of the cylindrical member, and thus movement of the holder in the longitudinal direction of the cylindrical member is restricted due to the claw portion. Thus, the holder is even less likely to separate from the cylindrical member.

[3] A wire harness according to the present disclosure includes the holder, the wire member, and the cylindrical member.

According to the configuration, the holder of the wire harness is less likely to separate from the cylindrical member.

[4] It is preferable that the through portion is a circular through hole.

According to the configuration, the through portion is a circular through hole, and thus compared to the case where the through portion has another complex shape, manufacturing of the cylindrical member is easy.

[5] It is preferable that the through portion is a fixing slit cut from a longitudinal end face of the cylindrical member, the fixing slit includes an axially extending portion that extends from the longitudinal end face of the cylindrical member in the longitudinal direction of the cylindrical member, and a circumferentially extending portion that bends and extends from a leading end of the axially extending portion toward one side in the circumferential direction, and the fixing portion is configured to be disposed in the circumferentially extending portion via the axially extending portion and is disposed in the circumferentially extending portion.

According to the configuration, the through portion is a fixing slit having the axially extending portion and the circumferentially extending portion, and the fixing portion can be disposed in the circumferentially extending portion via the axially extending portion. Thus, the holder can be easily attached to the cylindrical member.

[6] It is preferable that a tape that is wound so as to surround the wire member and the holding piece and holds the wire member in the holding piece, wherein the tape is wound in the same direction as a direction in which the circumferentially extending portion extends.

According to the configuration, the tape wound so as to surround the wire member and holding piece is wound in the same direction as the direction in which the circumferentially extending portion extends. As such, the direction in which the force is applied to the holder during the winding of the tape is the same direction as the direction in which the circumferentially extending portion extends. Thus, separation of the fixing portion from the circumferentially extending portion can be suppressed during the winding of the tape.

DESCRIPTION OF EMBODIMENTS OF THE PRESENT DISCLOSURE

Specified examples of the wire harness according to the present disclosure will be described below with reference to the drawings. In the drawings, the configurations may be partially exaggerated or simplified for convenience in the description. Also, the dimensional ratios of various portions may differ among the drawings. Note that the present disclosure is not limited to these examples, but is defined by the claims, and it is intended to include all modifications within the scope and meaning equivalent to the scope of the claims. The terms "parallel" and "orthogonal" in this specification include not only strictly parallel and orthogonal relationships, but also approximately parallel and orthogonal relationships to the extent that effects of the present embodiment are achieved. Also, "circle" and "arc" in this specification include not only strictly a circle and an arc, but also approximately a circle and an arc to the extent that effects of the present embodiment are achieved.

Overall Configuration of Wire Harness 10

A wire harness 10 shown in FIG. 1 electrically connects two electric devices or three or more electric devices to each other. For example, the wire harness 10 electrically connects an inverter 11 installed at a front portion of a vehicle V such as a hybrid car or an electric car, to a high-voltage battery 12 installed rearward of the inverter 11 in the vehicle V. The wire harness 10 is routed so as to pass under the floor of the vehicle V, for example. For example, the wire harness 10 is routed such that an intermediate portion in the longitudinal direction of the wire harness 10 passes outside of the vehicle interior such as under the floor of a vehicle V.

The inverter 11 is connected to a wheel drive motor (not shown), which serves as a power source for traveling of the vehicle. The inverter 11 generates AC power from DC power supplied from the high-voltage battery 12, and supplies the AC power to the motor. The high-voltage battery 12 is a battery capable of supplying several hundred volts, for example.

Figure 2:
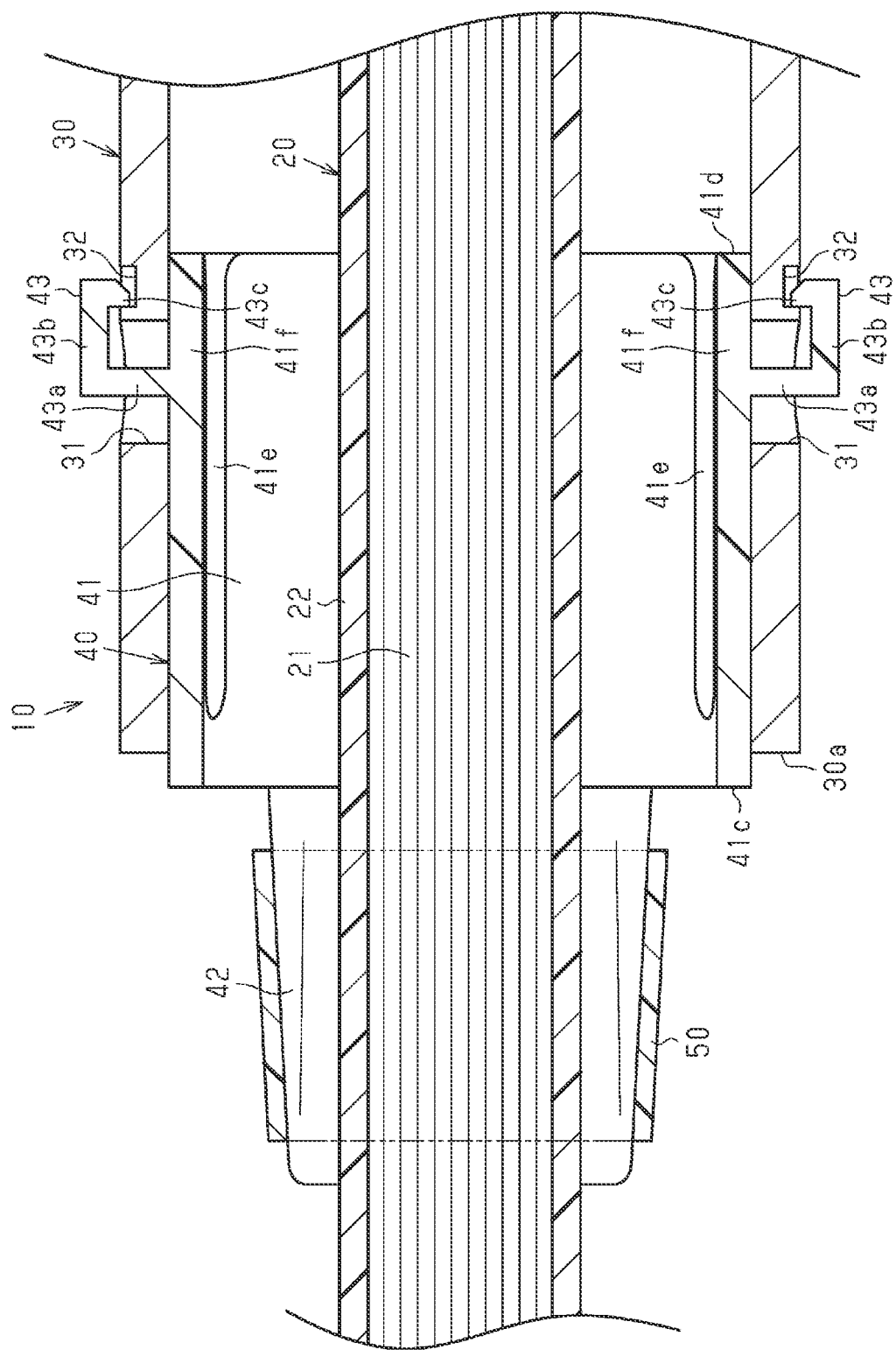
FIG. 2 is a partial cross sectional view of the wire harness according to an embodiment.

As shown in FIG. 2, the wire harness 10 includes a wire member 20 (wire) that electrically connects the electric devices to each other, a cylindrical member 30 (cylinder) that covers the outer circumference of the wire member 20, and a holder 40 attached to an end portion in the longitudinal direction of the cylindrical member 30.

Configuration of Wire Member 20

The wire member 20 includes a core wire 21 constituted by a plurality of metal strands, and an insulating coating 22 that coats the outer circumference of the core wire 21.

For example, as the core wire 21, a twisted wire obtained by twisting a plurality of metal strands together or a braided member obtained by braiding a plurality of metal strands into a cylindrical shape may be used. The core wire 21 of the present embodiment is a twisted wire. As a material for the core wire 21, a metal material such as copper or aluminum can be used. Note that the core wire 21, which is a twisted wire, is schematically shown in FIG. 2.

The insulating coating 22 covers the entirety of outer circumferential surface in the circumferential direction of the core wire 21. The insulating coating 22 is made of an insulating material such as a synthetic resin, for example.

Configuration of Cylindrical Member 30

The cylindrical member 30 has an elongated cylindrical shape. The cylindrical member 30 of the present embodiment has a perfectly cylindrical shape. The cylindrical member 30 accommodates an intermediate portion in the longitudinal direction of the wire member 20. The cylindrical member 30 surrounds the entirety of the outer circumference of the wire member 20 in the circumferential direction, for example. The cylindrical member 30 is more solid than the insulating coating 22 of the wire member 20, for example. As the cylindrical member 30, for example, a metal pipe made of a metal, or a resin pipe made of a resin can be used. As the material for the metal pipe, for example, a metal material such as aluminum or copper can be used. As the material for the resin pipe, a synthetic resin such as polyolefin, polyamide, polyester, or ABS resin, for example, can be used. The cylindrical member 30 of the present embodiment is formed by a metal pipe.

The cylindrical member 30 is bent in a two-dimensional or three-dimensional manner at a portion extending upward from under the floor or the like of the vehicle V. For example, the wire harness 10 is formed by inserting the wire member 20 in a straight state into the cylindrical member 30 in a straight state and bending the cylindrical member 30 with the wire member 20 inserted therein.

Figure 3:
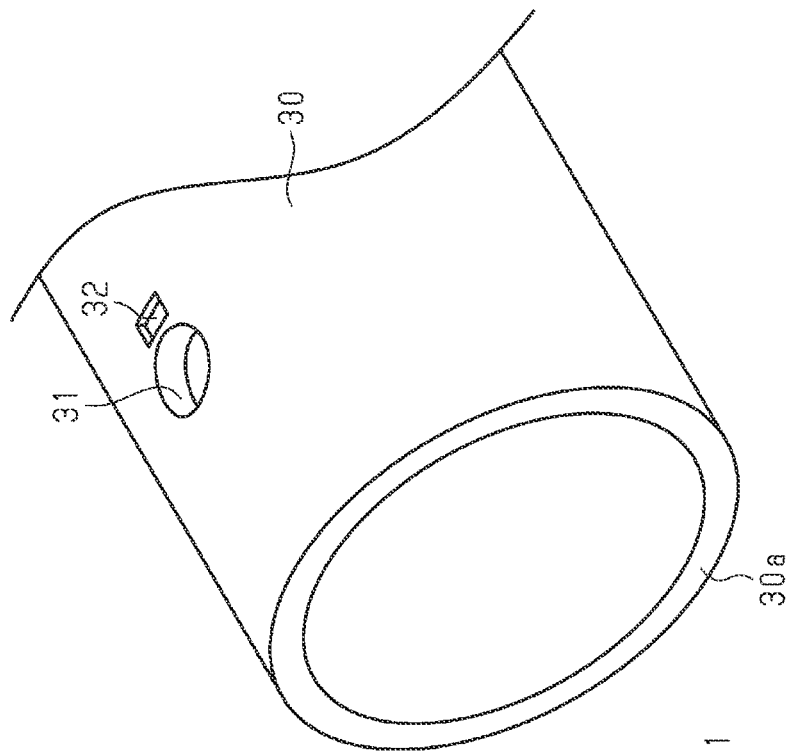
FIG. 3 is a partial exploded perspective view of the wire harness according to an embodiment.
Figure 3:
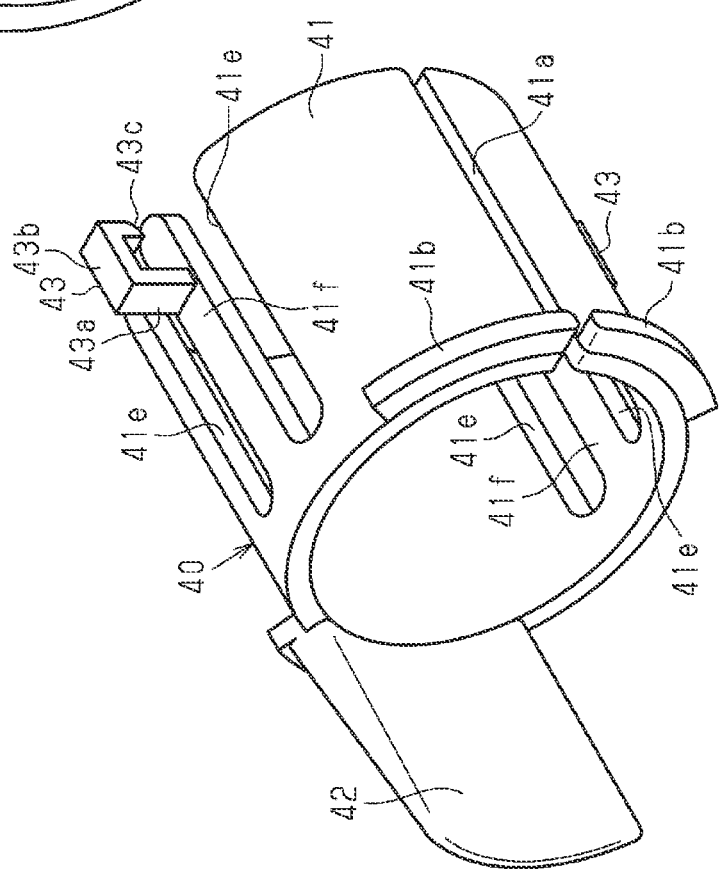

As shown in FIGS. 2 and 3, the cylindrical member 30 includes circular through holes 31 serving as through portions. The through holes 31 are provided near the end portion in the longitudinal direction of the cylindrical member 30. The through holes 31 are provided at two positions in the circumferential direction of the cylindrical member 30. The through holes 31 are provided in the circumferential direction of the cylindrical member 30 at an equal interval.

The cylindrical member 30 includes recessed portions 32 (recesses). The recessed portions 32 are recessed from the outer circumferential face of the cylindrical member 30. The recessed portions 32 are provided at positions corresponding to the through boles 31. Specifically, the recessed portions 32 are respectively provided at positions slightly further from the longitudinal end portion of the cylindrical member 30 than the through holes 31. Also, the recessed portions 32 are provided at the same positions as the through holes 31 in the circumferential direction of the cylindrical member 30.

Configuration of Holder 40

The holder 40 includes an inner fitting portion 41 (inner fitting), a holding piece 42, and fixing portions 43. The inner fitting portion 41 has a cylindrical shape. Specifically, as shown in FIG. 3, the cross section of the inner fitting portion 41 has a C shape. The inner fitting portion 41 includes first slits 41a extending over the entire length in the longitudinal direction of the inner fitting portion 41. As shown in FIG. 2, the inner fitting portion 41 is fitted inwardly to the longitudinal end portion of the cylindrical member 30. The outer circumferential surface of the inner fitting portion 41 opposes the inner circumferential surface of the cylindrical member 30. The inner fitting portion 41 includes flange portions 41b. The flange portions 41b are provided at a first end portion 41c in the longitudinal direction of the inner fitting portion 41. The flange portions 41b protrude radially outward from the inner fitting portion 41. The flange portions 41b are provided at a portion of the inner fitting portion 41 in the circumferential direction. The pair of flange portions 41b are provided at positions adjacent to the first slits 41a. The flange portions 41b are in contact with the end face 30a in the longitudinal direction of the cylindrical member 30 in a state where the inner fitting portion 41 is inwardly fitted to the cylindrical member 30.

The holding piece 42 is provided at the first end portion 41c in the longitudinal direction of the inner fitting portion 41. The holding piece 42 protrudes from the inner fitting portion 41 outward of the end portion in the longitudinal direction of the cylindrical member 30. The holding piece 42 is provided at a portion in the circumferential direction of the inner fitting portion 41. The holding piece 42 is provided at the side opposite to the first slits 41a in the circumferential direction of the inner fitting portion 41.

The fixing portions 43 protrude radially outward from the inner fitting portion 41. Specifically, the inner fitting portion 41 includes second slits 41e extending toward the first end portion 41c from the second end portion 41d in the longitudinal direction of the inner fitting portion 41. The inner fitting portion 41 includes flexible pieces 41f each sandwiched between the pair of second slits 41e. The second end portion 41d side of the flexible pieces 41f is configured to bend in the radial direction. The flexible pieces 41f are provided at two positions in the circumferential direction of the inner fitting portion 41. The flexible pieces 41f are provided at an equal interval in the circumferential direction of the inner fitting portion 41. The flexible pieces 41f are provided between the first slit 41a and the holding piece 42 in the circumferential direction of the inner fitting portion 41. The fixing portions 43 are respectively provided at the flexible pieces 41f.

The fixing portions 43 each include an outward extending portion 43a (outward extension), a bent extending portion 43b (bent extension), and a claw portion 43c (claw). Each outward extending portion 43a protrudes radially outward from the inner fitting portion 41 and passes through the through hole 31 of the cylindrical member 30. The bent extending portion 43b bends and extends from the leading end of the outward extending portion 43a. The bent extending portion 43b of the present embodiment extends toward the second end portion 41d along the longitudinal direction of the inner fitting portion 41. The claw portion 43c protrudes from the leading end of the bent extending portion 43b toward the outer circumferential face of the inner fitting portion 41, and is fitted to the recessed portion 32 of the cylindrical member 30. The claw portion 43c engages with the inner wall faces of the recessed portion 32 and restricts the inner fitting portion 41 from moving in the direction in which the inner fitting portion 41 come out of the cylindrical member 30.

As shown in FIG. 2, the wire member 20 is held by the holding piece 42 using a tape 50. In other words, the wire harness 10 includes the tape 50. One main surface of the tape 50 is an adhesive layer. The tape 50 is wound so as to surround the wire member 20 and the holding piece 42 such that the wire member 20 is held by the holding piece 42.

The following describes the operations of the present embodiment.

In the wire harness 10, the inner fitting portion 41 is inserted to the cylindrical member 30 while bending the flexible pieces 41f radially inward, and when the fixing portions 43 reach the through holes 31, the fixing portions 43 are fitted into the through holes 31. Then, in the state where the outward extending portions 43a pass through the through holes 31 and the claw portions 43c are fitted into the recessed portions 32, the holder 40 is fixed to the cylindrical member 30. Also, the wire member 20 is held in the holding piece 42 by the tape 50. With the wire harness 10 configured as above, the position of the wire member 20 with respect to the end portion of the cylindrical member 30 can be held. Also, for example, the wire member 20 can be prevented from sliding against the end face 30a in the longitudinal direction of the cylindrical member 30, and damage to the wire member 20 can be prevented.

The following describes effects of the present embodiment.

(1) The fixing portions 43 that protrude radially outward from the inner fitting portion 41 each include the outward extending portion 43a that protrudes radially outward from the inner fitting portion 41 and passes through the through hole 31 of the cylindrical member 30, and the bent extending portion 43b that bends and extends from the leading end of the outward extending portion 43a. Accordingly, the fixing portions 43 are less likely to come out of the through holes 31. As such, the holder 40 is less likely to separate from the cylindrical member 30.

(2) Since each fixing portion 43 includes the claw portion 43c that protrudes from the leading end of the bent extending portion 43b and is fitted to the recessed portion 32 provided at the outer circumferential face of the cylindrical member 30, movement of the holder 40 in the longitudinal direction of the cylindrical member 30 due to the claw portion 43c is restricted. Accordingly, the holder 40 is less likely to separate from the cylindrical member 30.

(3) The through portions of the cylindrical member 30 through which the outward extending portions 43a pass are circular through holes 31. As such, compared with a case where the through portions have another complex shape, manufacturing of the cylindrical member 30 is easier.

Modifications

The present embodiment can be implemented with modifications such as the following. The present embodiment and the following modifications can be implemented in combination with each other as long as no technical contradiction arises.

Although the above embodiment described that the through portion of the cylindrical member 30 is the circular through holes 31, there is no limitation to this, and the through portion may be changed to a through portion having another shape.

Figure 4:
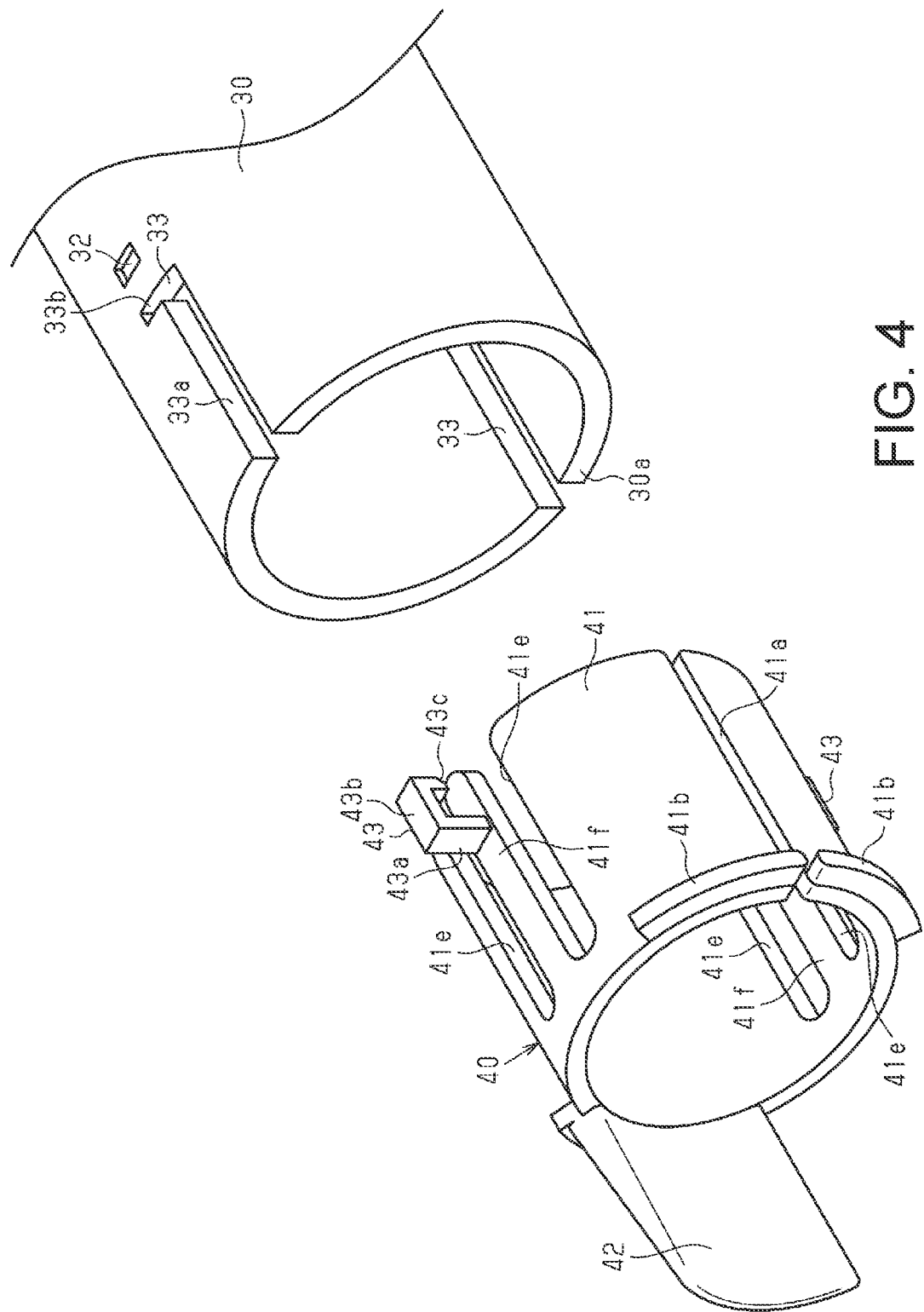
FIG. 4 is a partial exploded perspective view of a wire harness according to another example.
Figure 5:
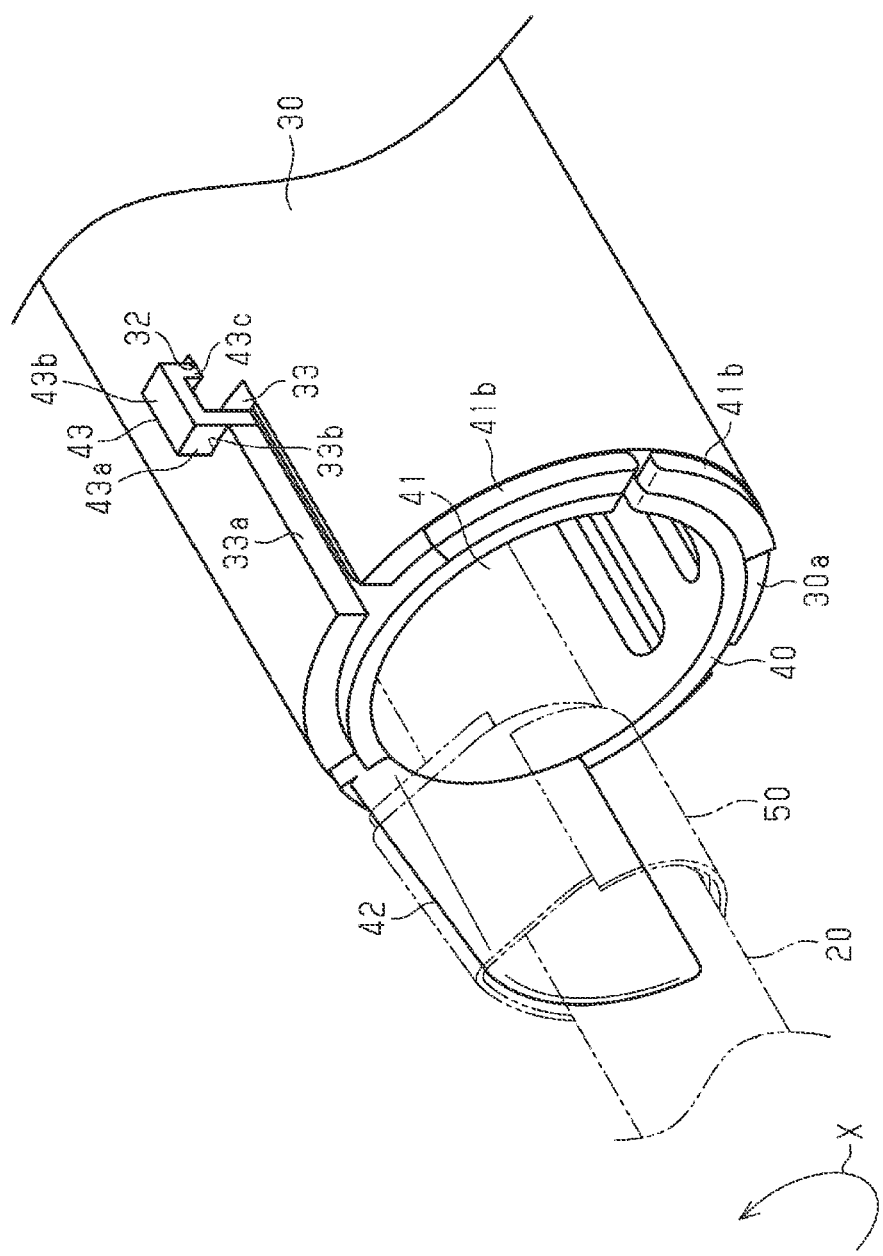
FIG. 5 is a partial perspective view of the wire harness according to the other example.

For example, as shown in FIGS. 4 and 5, the through portions may be fixing slits 33 cut from the end face 30a in the longitudinal direction of the cylindrical member 30. The fixing slits 33 each include an axially extending portion 33a (axial extension) extending in the longitudinal direction of the cylindrical member 30 from the longitudinal end face 30a of the cylindrical member 30, and a circumferentially extending portion 33b (circumferential extension) bending and extending from the leading end of the axially extending portion 33a toward one side in the circumferential direction. Also, the fixing portions 43 are configured to be disposed in the circumferentially extending portions 33b via the axially extending portions 33a, and disposed in the circumferentially extending portions 33b. Specifically, the outward extending portion 43a of each fixing portion 43 is configured to be disposed in the circumferentially extending portion 33b via the axially extending portion 33a without bending the flexible piece 41f, and is disposed in the circumferentially extending portion 33b. Note that, in the state where the outward extending portions 43a are disposed in the circumferentially extending portions 33b, the claw portions 43c are fitted to the recessed portions 32.

In this configuration, the holder 40 can be easily attached to the cylindrical member 30.

Also, as shown in FIG. 5, in this example, the tape 50 is wound in the direction X that is the same as the direction in which the circumferentially extending portions 33b extend.

In this configuration, a force that is applied to the holder 40 during winding the tape 50 is applied in the same direction as the direction in which the circumferentially extending portions 33b extend. Accordingly, separation of the fixing portion 43 from the circumferentially extending portion 33b during winding the tape 50 is suppressed. Accordingly, the fixing portions 43 are less likely to come out of the fixing slits 33. Thus, the holder 40 is less likely to separate from the cylindrical member 30.

Although in the above embodiment described that the fixing portions 43 include the claw portions 43c, there is no limitation to this, and a configuration is also possible in which the fixing portions 43 have no claw portions 43c. Note that, in this case, the cylindrical member 30 may have no recessed portions 32.

Although the above embodiment described that the wire member 20 can be held in the holding piece 42 by the tape 50, there is no limitation to this, and a configuration is also possible in which, for example, the wire member 20 is held by the holding piece 42 using a resin cable tie or the like.

Although, in the above embodiment, one wire member 20 is illustrated in the drawings, there is no limitation to this, and a configuration is also possible in which there are a plurality of wire members 20.

The recessed portions 32 of the above embodiment may pass through the cylindrical member 30.

Although the above embodiment described that the bent extending portions 43b each extend toward the second end portion 41d along the longitudinal direction of the inner fitting portion 41, there is no limitation to this, and a configuration is also possible in which the bent extending portions 43b bends and extends from the leading end of the outward extending portions 43a along another direction.

Although the above embodiment described that the two through holes 31 are provided in the circumferential direction of the cylindrical member 30, there is no limitation to this, and a configuration is also possible in which one through hole 31 or three or more through holes 31 are provided in the circumferential direction of the cylindrical member 30. Also, although the above embodiment described that the two fixing portions 43 are provided in the circumferential direction of the inner fitting portion 41, the number of the fixing portions 43 may be changed to a number corresponding to the through holes 31, and a configuration is also possible in which one fixing portion 43 or three or more fixing portions 43 are provided in the circumferential direction of the inner fitting portion 41.

Although the above embodiment described that the wire harness 10 electrically connects the inverter 11 and the high voltage battery 12 to each other, there is no limitation to this, and a configuration is also possible in which the wire harness 10 electrically connects other electric devices.

The above embodiment described that, as shown in FIG. 3, in each flexible piece 41f, the longitudinal end portion on the first end portion 41c side of the inner fitting portion 41 may be the fixed end, and the longitudinal end portion on the second end portion 41d side in the direction of the inner fitting portion 41 may be the free end, and the fixing portion 43 may be provided at the free end of the flexible piece 41f. The flexible pieces 41f of the embodiment may be referred to as cantilever plate spring.

As shown in FIG. 2, the outer circumferential surfaces of the free end of the flexible pieces 41f may radially support the inner circumferential surface of the cylindrical member 30.

In the above embodiment, as shown in FIGS. 2 to 4, in the bent extending portion 43b, the end portion on the outward extending portion 43a side may be the fixed end and the end portion on the claw portion 43c side may be the free end, and may bend in the radial direction of the inner fitting portion 41 with the fixed end as the origin.

In the above embodiment, as shown in FIGS. 2 to 4, each claw portion 43c can include a leading end that faces the outer circumferential surface of the inner fitting portion 41, such as, for example, the outer circumferential surface of the flexible piece 41f. The leading end of the claw portion 43c may include an inclined surface that inclines from the inner side to the outer side in the radial direction of the inner fitting portion 41 proceeding from the first end portion 41c in the longitudinal direction of the inner fitting portion 41 toward the second end portion 41d.

As shown in FIG. 2, the flexible pieces 41f may extend with a certain length in the axial direction such that the outer circumferential surfaces of the flexible pieces 41f face the claw portions 43c of the corresponding fixing portions 43 in the radial direction. A gap that is smaller than the wall thickness of the cylindrical member 30 may be defined between the leading end of the claw portions 43c of the fixing portions 43 and the outer circumferential face of the corresponding flexible piece 41f.

In the above embodiment, as shown in FIG. 2, in the state where the fixing portions 43 are fitted into the through holes 31, and the inner fitting portion 41 has been inserted to the cylindrical member 30 to the extent where the flexible pieces 41f elastically restore radially outward, when the inner fitting portion 41 is further inserted, the claw portions 43c may ride up onto the outer circumferential face of the cylindrical member 30, and the bent extending portions 43b may be bent radially outward of the inner fitting portion 41. When the inner fitting portion 41 is further inserted, the claw portions 43c may be fitted into the recessed portions 32, the bent extending portions 43b may restore elastically radially inward of the inner fitting portion 41, and the holder 40 may be fixed to the cylindrical member 30.

As in JP 2015-35915A, the holder 40 of the embodiment may be formed from a synthetic resin member.

The fixing portions 43 of the embodiment may be referred to as hooks or synthetic resin hooks. The outward extending portion 43a, the claw portion 43c, and the bent extending portion 43b of each fixing portion 43 may be referred to as a base end of the hook, a leading end of the hook, and an intermediate portion between the base end and leading end of the hook.

In the above embodiment, as shown in FIGS. 4 and 5, the width dimension of the axially extending portions 33a of the fixing slits 33 in the circumferential direction of the cylindrical member 30 may be the same as or slightly larger than the width dimension of the outward extending portions 43a in the circumferential direction of the inner fitting portion 41. The width dimension in the longitudinal direction of the cylindrical member 30 of the circumferentially extending portion 33b of each fixing slit 33 may be the same as or slightly larger than the thickness dimension in the longitudinal direction of the inner fitting portion 41 of the outward extending portion 43a.

In the above embodiment, as shown in FIGS. 4 and 5, the recessed portion 32 may be provided at a position slightly further than the circumferentially extending portion 33b from the end portion at which the inner fitting portion 41 is inserted in the longitudinal direction of the cylindrical member 30, and provided at the same position as the circumferentially extending portion 33b in the circumferential direction of the cylindrical member 30.

In the above embodiment, as shown in FIGS. 4 and 5, when the inner fitting portion 41 is inserted into the cylindrical member 30, each outward extending portion 43a may enter the axially extending portion 33a, and move from the base end thereof to the leading end along the axially extending portion 33a. When each outward extending portion 43a approaches the leading end of the axially extending portion 33a, the claw portion 43c may ride up onto the outer circumferential face of the cylindrical member 30, and the bent extending portion 43b may bend radially outward of the inner fitting portion 41. When each outward extending portion 43a is moved to the leading end of the axially extending portion 33a, the holder 40 may be rotated in the circumferential direction (X direction) with respect to the cylindrical member 30, each outward extending portion 43a may enter the circumferentially extending portion 33b, and move along the circumferentially extending portion 33b. When the holder 40 further is rotated, the claw portion 43c may be fitted to the recessed portion 32, the bent extending portion 43b may elastically restore radially inward of the inner fitting portion 41, and the holder 40 may be fixed to the cylindrical member 30.

The combination of the holder 40 having the claw portion 43c and the cylindrical member 30 having the recessed portion 32 of the embodiment may be referred to as a cylindrical exterior assembly configured to protect the wire member 20.

The invention claimed is:

1. A holder comprising:
   an inner fitting that is configured to be fitted into a longitudinal end of a cylinder that covers an outer circumference of a wire;
   a holding piece that protrudes from the inner fitting outward of the longitudinal end of the cylinder, and is configured to hold the wire; and
   a fixing portion that protrudes radially outward from the inner fitting,
   wherein the fixing portion includes:
      an outward extension that protrudes radially outward from the inner fitting and is configured to pass through a through portion provided in the cylinder; and
      a bent extension that bends and extends from a leading end of the outward extension.

2. The holder according to claim 1,
   wherein the fixing portion includes a claw that protrudes from a leading end of the bent extension and is configured to be fitted into a recess provided in an outer circumferential face of the cylinder.

3. A wire harness comprising:
   the holder according to claim 1;
   the wire; and
   the cylinder.

4. The wire harness according to claim 3,
   wherein the through portion is a circular through hole.

5. The wire harness according to claim 3, wherein:
   the through portion is a fixing slit cut from a longitudinal end face of the cylinder,
   the fixing slit includes an axial extension that extends from the longitudinal end face of the cylinder in a longitudinal direction of the cylinder, and a circumferential extension that bends and extends from a leading end of the axial extension toward one side in a circumferential direction, and
   the fixing portion is configured to be disposed in the circumferential extension via the axial extension and is disposed in the circumferential extension.

6. The wire harness according to claim 5, further comprising:
   a tape that is wound so as to surround the wire and the holding piece and holds the wire in the holding piece,
   wherein the tape is wound in a same direction as a direction in which the circumferential extension extends.

* * * * *